(12) United States Patent
Anzai

(10) Patent No.: US 11,084,003 B2
(45) Date of Patent: Aug. 10, 2021

(54) ULTRAFINE BUBBLE GENERATION DEVICE FOR AQUACULTURE OR WASTEWATER TREATMENT

(71) Applicant: Satoshi Anzai, Yokohama (JP)

(72) Inventor: Satoshi Anzai, Yokohama (JP)

(73) Assignees: Satoshi Anzai, Kanagawa (JP); NANOBUBBLE SOLUTIONS LIMITED, London (GB)

(*) Notice: Subject to any disclaimer, the term of this patent is extended or adjusted under 35 U.S.C. 154(b) by 232 days.

(21) Appl. No.: 16/309,653

(22) PCT Filed: Jun. 13, 2017

(86) PCT No.: PCT/JP2017/021789
§ 371 (c)(1),
(2) Date: Dec. 13, 2018

(87) PCT Pub. No.: WO2017/217402
PCT Pub. Date: Dec. 21, 2017

(65) Prior Publication Data
US 2019/0262783 A1 Aug. 29, 2019

(30) Foreign Application Priority Data
Jun. 15, 2016 (JP) .............................. JP2016-119195

(51) Int. Cl.
*B01F 3/04* (2006.01)
*A01K 63/04* (2006.01)
(Continued)

(52) U.S. Cl.
CPC .......... *B01F 3/04106* (2013.01); *A01K 63/04* (2013.01); *A01K 63/042* (2013.01);
(Continued)

(58) Field of Classification Search
CPC .......... B01F 3/04106; B01F 5/06; B01F 3/04; B01F 15/0243; B01F 2003/04567;
(Continued)

(56) References Cited

U.S. PATENT DOCUMENTS 1,250,303 A * 12/1917 Greenawalt .............. B03D 1/14
209/170
3,545,731 A * 12/1970 McManus ........... B01F 3/04106
209/168
(Continued)

FOREIGN PATENT DOCUMENTS

| CA | 1300321 | 5/1992 |
|---|---|---|
| CN | 105165705 A | 12/2015 |

(Continued)

OTHER PUBLICATIONS

Extended Search Report for corresonding EP Application No. 17813298.1 dated Jan. 15, 2020.
(Continued)

*Primary Examiner* — Stephen Hobson
(74) *Attorney, Agent, or Firm* — Cantor Colburn LLP

(57) ABSTRACT

Provided is an ultrafine bubble generation device for aquaculture or wastewater treatment with which it is possible to efficiently cause ultrafine bubbles to be dissolved or to coexist, and to increase the concentration of a gas in the liquid. An ultrafine bubble generation device for aquaculture or wastewater treatment provided with a channel for channeling a liquid, a compression device for pumping a gas into the channel, and a bubble generation medium for releasing the gas pumped by the compression device as ultrafine bubbles into the liquid in the channel, wherein the bubble generation medium is formed from a carbon-based porous (Continued)

material and is disposed so as to be horizontal or below horizontal with respect to the direction of flow of the liquid in the channel.

6 Claims, 13 Drawing Sheets

(51) Int. Cl.
| | |
|---|---|
| *B01F 15/02* | (2006.01) |
| *C02F 1/72* | (2006.01) |
| *C02F 1/74* | (2006.01) |
| *C02F 1/78* | (2006.01) |
| *C02F 3/26* | (2006.01) |
| *B01F 5/06* | (2006.01) |
| *B01F 15/00* | (2006.01) |
| *C02F 3/12* | (2006.01) |
| *C02F 103/00* | (2006.01) |
| *C02F 103/20* | (2006.01) |
| *C02F 103/34* | (2006.01) |

(52) U.S. Cl.
CPC ............ *B01F 3/04* (2013.01); *B01F 5/06* (2013.01); *B01F 15/00* (2013.01); *B01F 15/02* (2013.01); *B01F 15/0243* (2013.01); *C02F 1/72* (2013.01); *C02F 1/722* (2013.01); *C02F 1/727* (2013.01); *C02F 1/74* (2013.01); *C02F 1/78* (2013.01); *C02F 3/12* (2013.01); *C02F 3/26* (2013.01); *B01F 2003/04567* (2013.01); *B01F 2215/0052* (2013.01); *C02F 2103/007* (2013.01); *C02F 2103/20* (2013.01); *C02F 2103/34* (2013.01); *Y02W 10/10* (2015.05)

(58) Field of Classification Search
CPC ........ B01F 2215/0052; C02F 2103/007; C02F 2103/20; C02F 2103/34; C02F 1/722; C02F 1/727; C02F 1/74; C02F 1/78; C02F 3/26; A01K 63/042
See application file for complete search history.

(56) References Cited

U.S. PATENT DOCUMENTS

| | | | | |
|---|---|---|---|---|
| 3,662,781 | A * | 5/1972 | Figliola | B03B 5/623 137/543.17 |
| 3,772,188 | A * | 11/1973 | Edwards | B01F 3/0473 210/629 |
| 3,933,640 | A * | 1/1976 | Kirk | C02F 3/26 210/197 |
| 3,945,918 | A * | 3/1976 | Kirk | C02F 3/26 210/703 |
| 4,080,287 | A * | 3/1978 | Conway | C02F 3/085 210/604 |
| 4,571,326 | A * | 2/1986 | Bischoff | B01J 8/12 261/122.1 |
| 4,639,313 | A * | 1/1987 | Zipperian | B03D 1/245 209/170 |
| 4,639,354 | A * | 1/1987 | Bischoff | B01J 8/1818 261/122.1 |
| 4,971,731 | A * | 11/1990 | Zipperian | B01F 3/04475 209/170 |
| 5,078,921 | A * | 1/1992 | Zipperian | B01F 3/04475 209/170 |
| 5,316,682 | A * | 5/1994 | Keyser | B01F 3/04539 210/649 |
| 5,354,458 | A * | 10/1994 | Wang | B01D 53/46 210/180 |
| 5,399,267 | A * | 3/1995 | Wang | B09C 1/02 210/604 |
| 5,431,286 | A * | 7/1995 | Xu | B01F 5/045 209/168 |
| 6,221,254 | B1 * | 4/2001 | Dickerson | B01D 21/01 210/705 |
| 8,919,747 | B2 | 12/2014 | Anzai et al. | |
| 9,149,784 | B2 * | 10/2015 | Miller | B01D 53/76 |
| 2006/0033222 | A1 * | 2/2006 | Godfrey | C12M 29/06 261/122.1 |
| 2006/0103036 | A1 * | 5/2006 | Oades | B01F 3/04248 261/124 |
| 2009/0028776 | A1 * | 1/2009 | Osegovic | C02F 1/22 423/437.1 |
| 2009/0051057 | A1 * | 2/2009 | Kim | C02F 3/20 261/121.1 |
| 2010/0178685 | A1 * | 7/2010 | Kloss | B01F 3/04539 435/243 |
| 2011/0068057 | A1 * | 3/2011 | Haley, III | C02F 3/006 210/619 |
| 2011/0101548 | A1 * | 5/2011 | Kim | C02F 3/20 261/124 |
| 2011/0207170 | A1 * | 8/2011 | Niazi | C12M 23/28 435/41 |
| 2012/0175791 | A1 | 7/2012 | Anzai et al. | |
| 2013/0140246 | A1 * | 6/2013 | Fabiyi | B01F 3/04262 210/758 |
| 2015/0053625 | A1 | 2/2015 | Hoefken | |
| 2015/0290590 | A1 * | 10/2015 | Zou | B01F 3/04248 210/636 |
| 2015/0353377 | A1 * | 12/2015 | Al-Sulaiman | B01D 1/26 261/127 |
| 2016/0280573 | A1 * | 9/2016 | Livingston | B01D 63/082 |
| 2017/0081623 | A1 * | 3/2017 | Li | C12M 21/04 |
| 2017/0259219 | A1 * | 9/2017 | Russell | B01F 5/0465 |
| 2018/0186659 | A1 * | 7/2018 | Noles, Jr. | C02F 1/043 |
| 2019/0151808 | A1 * | 5/2019 | Giardullo | B01F 3/04744 |
| 2019/0185353 | A1 * | 6/2019 | Carvalho | B01F 3/04595 |
| 2019/0282971 | A1 * | 9/2019 | Rearden | C02F 1/727 |
| 2019/0366278 | A1 * | 12/2019 | Nielsen | C02F 3/20 |
| 2020/0398231 | A1 * | 12/2020 | Nagata | B01F 3/04248 |

FOREIGN PATENT DOCUMENTS

| | | |
|---|---|---|
| EP | 0226495 A1 | 6/1987 |
| JP | H02279158 A | 11/1990 |
| JP | 3958346 B1 | 8/2007 |
| JP | 2008132437 A | 6/2008 |
| JP | 2010167404 A | 8/2010 |
| JP | 2012011355 A | 1/2012 |
| JP | 2014000551 A | 1/2014 |
| JP | 2014209899 A | 11/2014 |
| JP | 2015514568 A | 5/2015 |
| JP | 2015108493 A | 6/2015 |
| JP | 2016055262 A | 4/2016 |
| WO | 2013139863 A1 | 9/2013 |

OTHER PUBLICATIONS

International Search Report corresponding to Application No. PCT/JP2017-021789; dated Aug. 15, 2017.

* cited by examiner

ULTRAFINE BUBBLE GENERATION DEVICE FOR AQUACULTURE OR WASTEWATER TREATMENT

CROSS REFERENCE TO RELATED APPLICATIONS

This is the U.S. national stage of application No. PCT/JP2017/021789, filed on Jun. 13, 2017. Priority under 35 U.S.C. § 119(a) and 35 U.S.C. § 365(b) is claimed from Japanese Application No. 2016-119195, filed on Jun. 15, 2016, the disclosures of which is also incorporated herein by reference.

TECHNICAL FIELD

The present invention relates to a technique of an ultrafine bubble generation device for aquaculture or wastewater treatment, for purifying wastewater or purifying aquaculture water and supplying oxygen to aquaculture water. In particular, the present invention relates to a technique of an ultrafine bubble generation device for aquaculture or wastewater treatment, for generating fine bubbles in a liquid.

BACKGROUND ART

Conventionally, ultrafine bubble generation devices for aquaculture or wastewater treatment are known. In aquaculture, there is known an ultrafine bubble generation device for supplying oxygen to oxidize and purify nitrides such as ammonia and urea, which inhibit growth in culturing of fish and shellfish (e.g., see Patent Literature 1). Further, in aquaculture, supplied oxygen activates fish and shellfish and promotes growth. In addition, in the wastewater treatment, there is known an ultrafine bubble generation device for supplying oxygen, ozone, or the like for performing oxidative decomposition treatment of organic matter contained in wastewater (e.g., see Patent Literature 2).

Further, in recent years, attention has been paid to a technique of using ultrafine bubbles having a bubble size (diameter) of less than 100 μm at a normal temperature and a normal pressure in a liquid such as tap water, lakes, rivers, or seawater. The ultrafine bubbles have a characteristic of a very large surface area and physicochemical characteristics such as a self-pressurizing effect. Techniques have been developed that make use of these characteristics and use the ultrafine bubbles for wastewater purification, cleaning, gas dissolution, agitation, and the like.

As a method of generating ultrafine bubbles having the above characteristics, there is conventionally known a method of arranging a liquid jet nozzle around a nozzle that releases gas pumped by a compressor, and tearing off and refining bubbles released from the nozzle by a jet force of the liquid jet nozzle. Further, there is also known a method of allowing bubbles formed by agitation to be pressed against and pass a mesh member, to subdivide the bubbles (e.g., see Patent Literature 3).

However, in the method of generating ultrafine bubbles using the conventional liquid jet nozzle and the method of generating ultrafine bubbles using the mesh member, devices have become larger. For this reason, it has been difficult to dispose the device in a liquid channel. Further, in the conventional ultrafine bubble generation device, a percentage of ultrafine bubbles in a liquid that reach a gas-liquid interface is relatively large, and an amount of a gas dissolved or coexisting in a liquid is reduced.

CITATIONS LIST

Patent Literature

Patent Literature 1: JP-A 2014-209899 Gazette
Patent Literature 2: JP-A 2014-000551 Gazette
Patent Literature 3: JP-B2 3958346 Gazette

SUMMARY OF INVENTION

Technical Problems

In view of the above problems, the present invention provides an ultrafine bubble generation device for aquaculture or wastewater treatment for allowing a gas to be efficiently dissolved in a liquid or allowing ultrafine bubbles to coexist, and enabling increase in a gas concentration in a liquid.

Solutions to Problems

The problem to be solved by the present invention is as described above. Next, means for solving this problem will be described.

That is, in the present invention, an ultrafine bubble generation device for aquaculture or wastewater treatment includes: a passage through which a liquid flows; a compressor to pump a gas to the passage; and a bubble-generating medium to release the gas pumped by the compressor as ultrafine bubbles to a liquid in the passage. The bubble-generating medium is formed of a carbon-based porous material, and is arranged so as to be horizontal or less with respect to a direction of a liquid flowing in the passage, the passage may include at least one tube, the bubble-generating medium may be disposed in the tube and the tube may be formed so as to be arrangeable in series in a direction parallel to a direction of a liquid flowing in the tube.

Further, in the present invention, it is more preferable that there may be provided, on a downstream side of the passage, a collection device to collect a gas released from a liquid; and a retransmission compressor to pump the gas from the collection device to the bubble-generating medium, and the retransmission compressor may be configured to pump the gas from the collection device to the bubble-generating medium when an amount of the gas collected by the collection device reaches a predetermined amount or more.

Further, in the present invention, it is more preferable that there may be provided a storage tank on a downstream side of the passage, and an agitator in the storage tank.

Further, in the present invention, it is more preferable that an internal space may be formed inside the bubble-generating medium, and a distance from the internal space to the bubble-generating medium surface may be set such that a ratio of a shortest distance to a longest distance is 1:40 or less.

Advantageous Effects of Invention

Effects of the present invention are as follows.

In the present invention, since the bubble-generating medium is formed of a porous member of a carbon-based material, it is possible to generate a large amount of ultrafine bubbles without generating a liquid flow with a liquid jet nozzle or the like. Further, since the bubble-generating medium is arranged so as to be horizontal or less with respect to a flowing direction of a liquid, ultrafine bubbles are more likely to be released downward, and an amount of a gas that reaches a liquid surface and is released into the air can be reduced.

Further, in the present invention, by arranging the bubble-generating medium in series in a flowing direction of a liquid, a time during which a liquid is in contact with the bubble-generating medium becomes long, and it is possible to effectively utilize the liquid flow to allow highly concentrated ultrafine bubbles to coexist with less power.

Further, in the present invention, it is possible to circulate and release a gas again into a liquid without releasing the gas into the air.

Further, in the present invention, in wastewater treatment, when performing oxidative decomposition treatment of organic matter contained in wastewater in a storage tank, it is possible to prevent precipitation of organic matter by agitation, and efficiently perform wastewater treatment.

Further, in the present invention, since the internal space is formed inside the bubble-generating medium, and the distance from the internal space to the bubble-generating medium surface is set such that the ratio of the shortest distance to the longest distance is 1:40 or less, it is possible to efficiently pump a gas to a surface of the bubble-generating medium, and generate ultrafine bubbles with use of the entire surface of the bubble-generating medium.

DESCRIPTION OF EMBODIMENTS

First Embodiment

Figure 1:
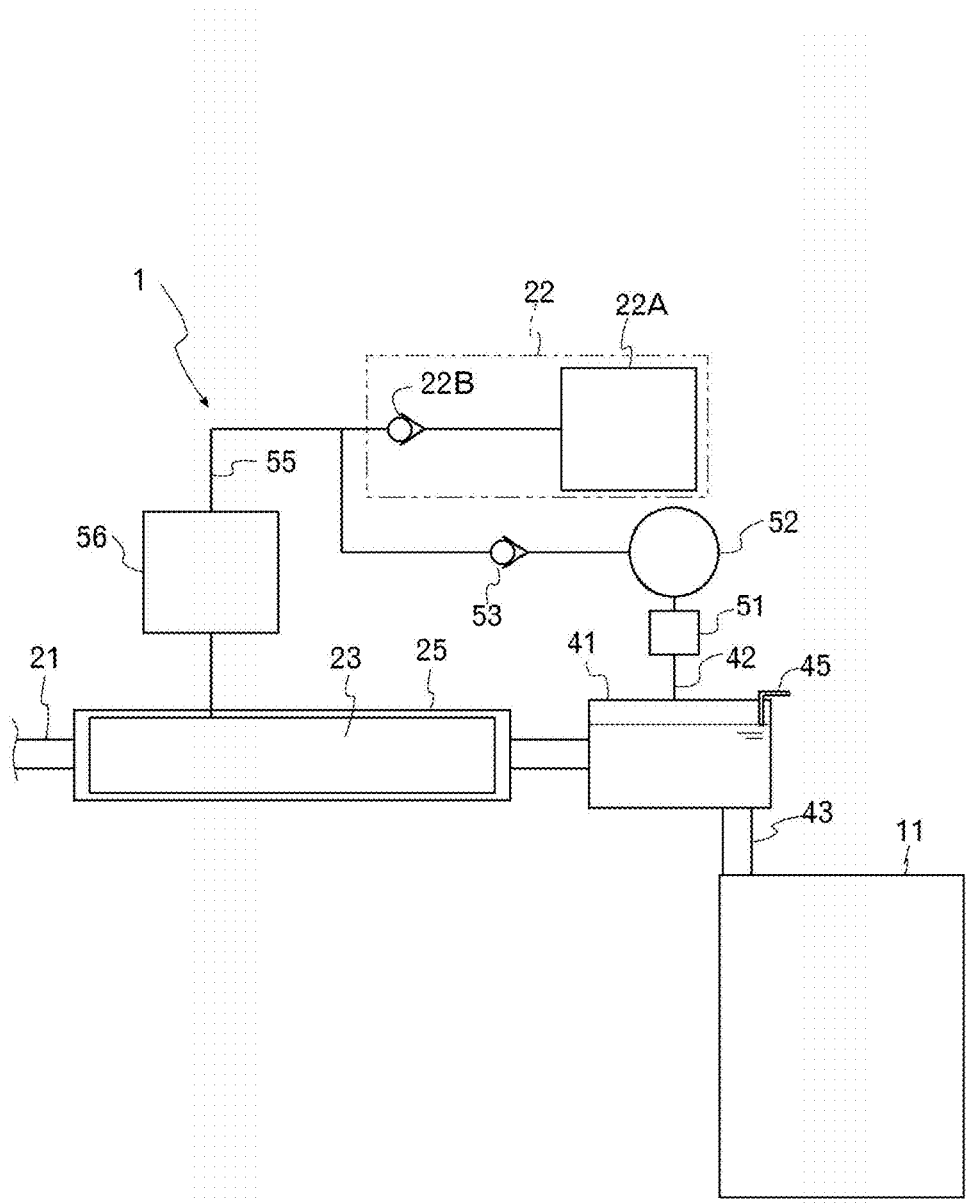
FIG. 1 is a front view showing an overall configuration of an ultrafine bubble generation device according to one embodiment of the present invention.

Next, an embodiment of the invention will be described.

First, an overall configuration of an ultrafine bubble generation device 1 according to one embodiment of the present invention will be described with reference to FIG. 1.

The ultrafine bubble generation device 1 is an ultrafine bubble generation device for aquaculture or wastewater treatment, and is a device for generating ultrafine bubbles in a liquid. Here, the term "ultrafine bubbles" means bubbles having a size (diameter) of less than 100 μm in causing a normal temperature and a normal pressure. As shown in FIG. 1, the ultrafine bubble generation device 1 is a device for supplying a liquid in which a gas is dissolved or coexisting to a storage tank 11, and includes: a passage 21 through which a liquid flows; a compressor 22 to pump a gas to the passage 21; and a bubble-generating medium 23 to release the gas pumped by the compressor 22, into a liquid in the passage 21 as ultrafine bubbles.

The storage tank 11 is a tank that stores a liquid in which a gas is dissolved or coexisting as ultrafine bubbles.

Here, the term "dissolved" means a state in which a gas is dissolved and exists in a liquid. In addition, the term "coexist" means a state in which a gas exists as ultrafine bubbles in a liquid.

The liquid stored in the storage tank 11 is seawater or fresh water such as rivers and lakes in a case of an ultrafine bubble generation device for aquaculture, while the liquid is seawater, fresh water such as rivers and lakes, domestic wastewater, industrial wastewater, or the like in a case of an ultrafine bubble generation device for wastewater treatment.

Further, the gas to be supplied to the storage tank 11 is air, oxygen, ozone, hydrogen peroxide, or the like in a case of an ultrafine bubble generation device for aquaculture, while the gas is a gas having an oxidizing action, such as oxygen, ozone, or hydrogen peroxide, in a case of an ultrafine bubble generation device for wastewater treatment.

In the ultrafine bubble generation device for aquaculture, fish and shellfish are cultured in the storage tank 11. Culturing fish and shellfish in a liquid in which a gas is dissolved or coexisting as ultrafine bubbles can activate aerobic bacteria or the like that decompose excrement of fish and shellfish, and can purify the liquid. Further, sufficiently supplying oxygen mainly can improve immunity of cultured fish and shellfish, and promote growth of fish and shellfish.

In the ultrafine bubble generation device for wastewater treatment, wastewater is treated in the storage tank 11. Treating wastewater in a liquid in which a gas is dissolved or coexisting as ultrafine bubbles can activate bacteria or the like that decompose organic matter in the wastewater, and can purify the liquid.

The passage 21 is a member to allow a liquid to pass. In the passage 21, an upstream end in a liquid flow is connected to a liquid tank, sea, river, or the like. Further, an intermediate part of the passage 21 is formed by a tube 25.

The compressor 22 is a device to pump a gas to the bubble-generating medium 23. In the present embodiment, the compressor 22 includes a gas storage container 22A to store a gas and a check valve 22B.

Figure 2:
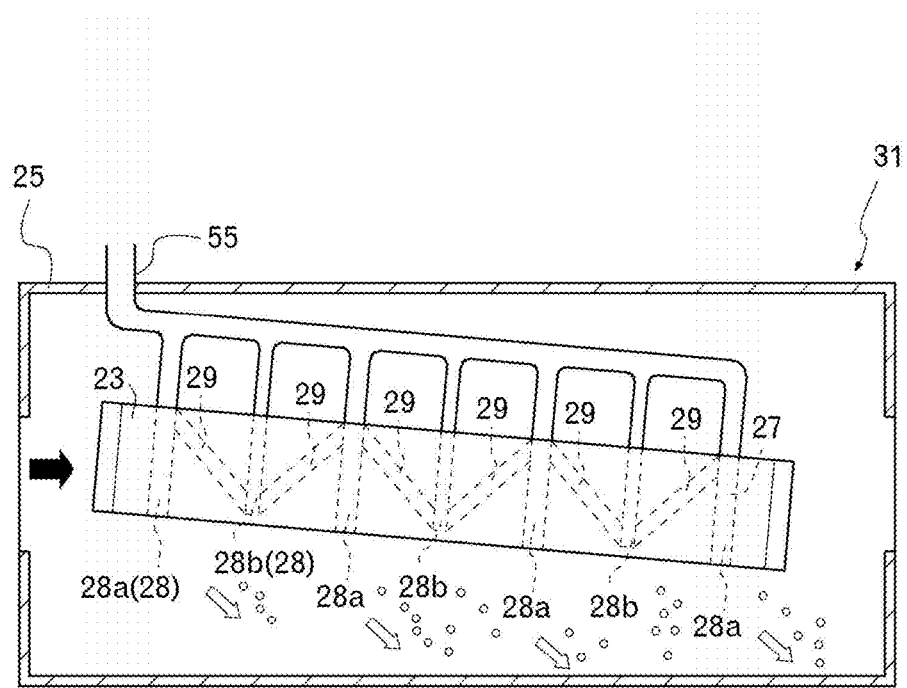
FIG. 2 is a front cross-sectional view of a tube and a bubble-generating medium according to a first embodiment of the present invention.

As shown in FIG. 1 and FIG. 2, the bubble-generating medium 23 is disposed inside the tube 25 forming the intermediate part of the passage 21. The bubble-generating medium 23 is arranged so as to be horizontal or less with respect to a direction of a liquid flowing in the tube 25 (a direction of a black arrow in FIG. 2). In the present embodiment, the bubble-generating medium 23 is arranged such that a downstream side is inclined downward with respect to a longitudinal direction of the tube 25.

Figure 3:
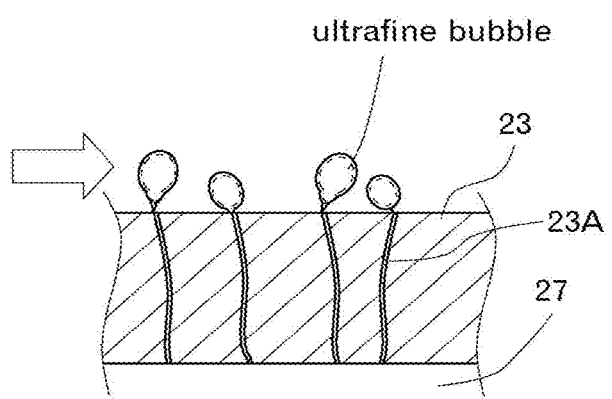
FIG. 3 is a partially enlarged cross-sectional view of the bubble-generating medium according to the first embodiment of the present invention.

Further, the bubble-generating medium 23 is made of a carbon-based porous material, and has a large number of fine holes 23A having a diameter of several μm to several tens μm as shown in FIG. 3. In addition, the bubble-generating medium 23 is a conductor, and bubbles generated from the bubble-generating medium 23 are charged with negative charges. In other words, when passing through the bubble-generating medium 23 as a conductor, ultrafine bubbles are added with free electrons, to be charged with negative charges. This negative charge causes bubbles to repel each other and can prevent the bubbles from coalescing into large bubbles.

The carbon-based porous material is a composite material containing carbon alone or carbon and ceramic, and is an inorganic material. Further, a surface of the carbon-based porous material is formed with a film having a thickness of several nm. The film is formed of an inorganic film containing silicon.

Figure 4:
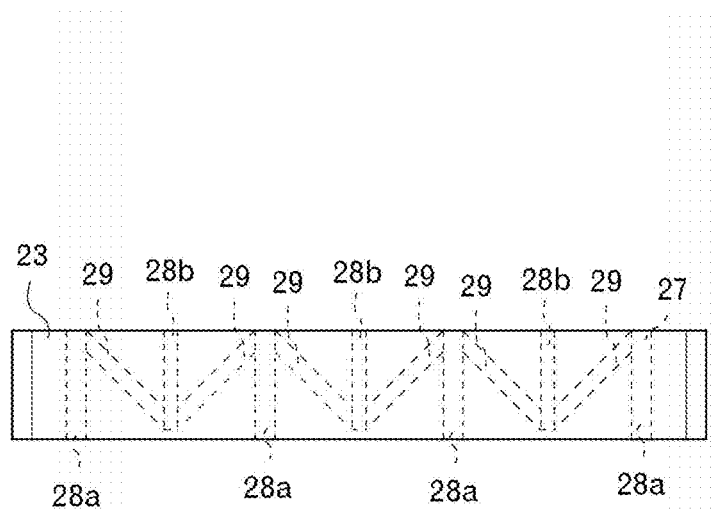
FIG. 4 is a front view of the bubble-generating medium according to the first embodiment of the present invention.
Figure 5:
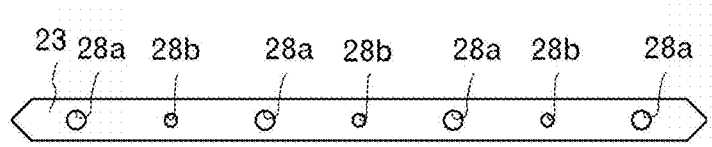
FIG. 5 is a plan view of the bubble-generating medium according to the first embodiment of the present invention.

Further, as shown in FIG. 4 and FIG. 5, the bubble-generating medium 23 is formed into a polygonal columnar shape, and a bubble-generating medium passage 27 is formed as an internal space in the bubble-generating medium 23. The bubble-generating medium passage 27 has two types of parallel passages 28 having different cross sectional diameters provided inside the bubble-generating medium 23 and provided in parallel with an edge in a short direction in front view from one surface of the bubble-generating medium 23, and an inclined passage 29 connecting the parallel passages 28 to each other. The parallel passage 28 is formed by a first parallel passage 28a having a large cross sectional diameter and a second parallel passage 28b having a small cross sectional diameter.

The first parallel passage 28a is formed passing through inside the bubble-generating medium 23. One end of the second parallel passage 28b communicates with a surface (upper surface) of the bubble-generating medium 23, and the other end is disposed in the bubble-generating medium 23. The first parallel passage 28a and the second parallel passage 28b are alternately arranged. The inclined passage 29 is a passage connecting the first parallel passage 28a and the second parallel passage 28b, and is a passage connecting an upper end of the first parallel passage 28a and a lower end (closed end) of the second parallel passage 28b. To each upper end of the first parallel passage 28a, a gas is supplied from the compressor 22 via a gas passage 55.

Further, a surface on which bubbles are generated in the bubble-generating medium 23 is formed to have a total surface area of 2000 cm$^2$ or less. In the present embodiment, the surface on which bubbles are generated in the bubble-generating medium 23 is a side surface excluding upper and lower surfaces of the polygonal prism, and a total surface area is approximately 1600 cm$^2$.

Figure 6:
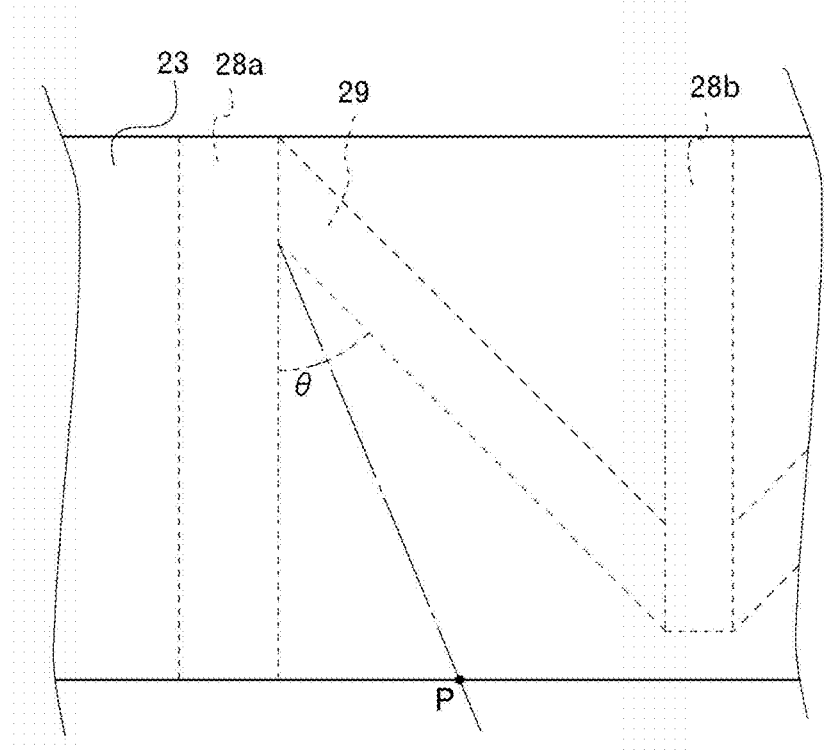
FIG. 6 is an enlarged front view of the bubble-generating medium according to the first embodiment of the present invention.
Figure 7:
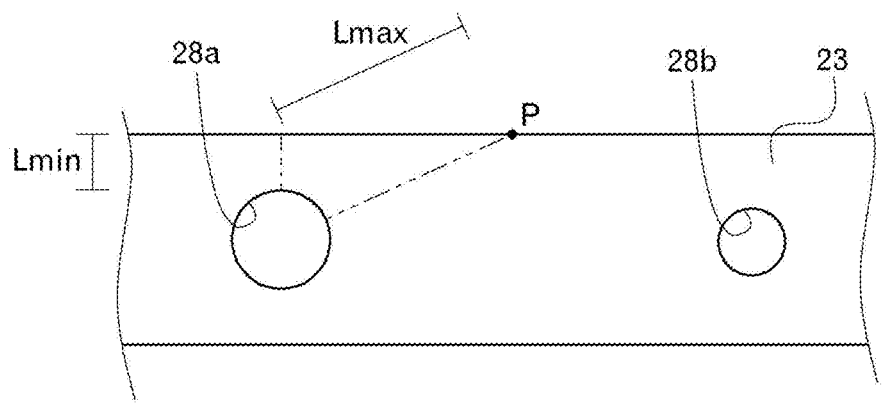
FIG. 7 is an enlarged plan view of the bubble-generating medium according to the first embodiment of the present invention.

Further, a distance between a surface of the bubble-generating medium 23 (mainly the side surface excluding the upper and lower surfaces) and the bubble-generating medium passage 27 is set such that a ratio of a shortest distance to a longest distance is 1:40 or less. As shown in FIG. 6 and FIG. 7, in the present embodiment, a length Lmin at a position with a shortest distance between the surface of the bubble-generating medium 23 and the bubble-generating medium passage 27 is approximately 3.5 mm. On the other hand, in the present embodiment, a length Lmax at a position with a longest distance between the surface of the bubble-generating medium 23 and the bubble-generating medium passage 27 is set to be 140 mm or less. In the present embodiment, the length Lmax at the position with the longest distance between the surface of the bubble-generating medium 23 and the bubble-generating medium passage 27 is, in front view, a distance to the bubble-generating medium passage 27 from an intersection point P of a bisector of an acute angle θ provided between the first parallel passage 28a and the inclined passage 29 of the bubble-generating medium 23 and the lower end surface of the bubble-generating medium 23, which is approximately 8 mm. This allows a gas to be uniformly supplied to the surface of the bubble-generating medium 23.

Figure 8:
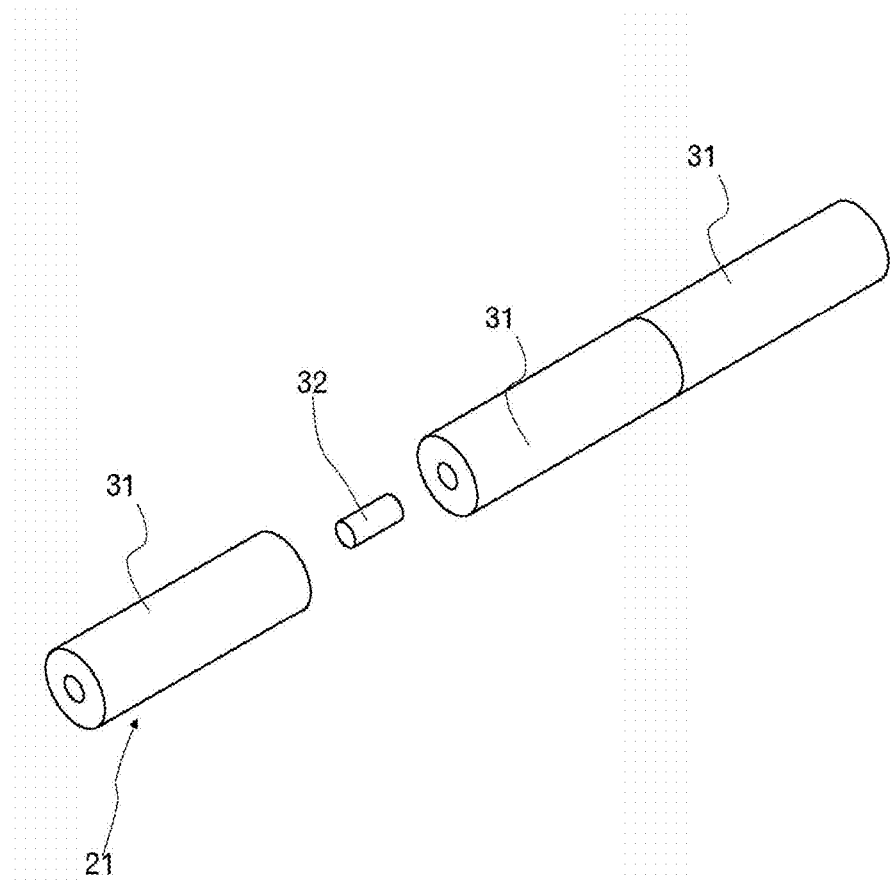
FIG. 8 is a perspective view of the tube according to the first embodiment of the present invention.

As shown in FIG. 8, the tube 25 and the bubble-generating medium 23 can also be provided as a unit 31. The unit 31 arranged with the bubble-generating medium 23 inside the tube 25 is configured to be connectable in series in a direction parallel to a direction of a liquid flowing in the tube 25 (the direction of the black arrow in FIG. 2). That is, a cylindrical connecting part 32 is provided at an upstream end and a downstream end of the tube 25, and the units 31 are connected in series to each other via the connecting part 32. Such a configuration allows the fine bubble generation device 1 to further supply ultrafine bubbles to a liquid in which ultrafine bubbles are already coexisting. For example, in a method of generating ultrafine bubbles by using a shear force, ultrafine bubbles recombine when the shear force is continuously applied, which rather reduces an amount of coexisting ultrafine bubbles. On the other hand, arranging the bubble-generating medium 23 in series in the liquid flow direction increases a time during which a liquid is in contact with the bubble-generating medium 23, and allows highly concentrated ultrafine bubbles to coexist with low power by effectively utilizing the liquid flow. Further, since the bubble-generating medium 23 is arranged in series, ultrafine bubbles can coexist without recombining. Such a configuration can increase an amount of ultrafine bubbles coexisting in the liquid.

As shown in FIG. 1, on the downstream side of the passage 21, a collection device 41 to collect a gas released from a liquid is disposed. The collection device 41 is formed by a container, and provided with, on an upper surface thereof, a releasing passage 42 to externally send the gas that is not dissolved or not coexisting in the liquid but released out of the liquid. Inside the collection device 41, a level sensor 45 is provided. The level sensor 45 is a device connected to a control device (not shown), and configured to detect whether or not a height of a liquid in the collection device 41 has become equal to or less than a certain level.

In a lower portion of the collection device 41, a water intake port 43 is provided. The water intake port 43 is a hole to take out a liquid in which a gas is dissolved or ultrafine bubbles are coexisting, and is connected to the storage tank 11 where wastewater treatment or aquaculture is performed.

In an intermediate part of the releasing passage 42, there are provided a dehydration device 51, a retransmission compressor 52, and a check valve 53. The retransmission compressor 52 is connected to a control device (not shown). The dehydration device 51 is a device to adsorb and desorb moisture contained in a gas released into the releasing passage 42, and is a device, for example, provided with a desorption film or a water absorbent such as silica gel. The retransmission compressor 52 pumps a gas to the bubble-generating medium 23 on the upstream side of the passage 21, only when an amount of a gas released to outside the liquid in the collection device 41 exceeds a predetermined value.

Further, the compressor 22 and the retransmission compressor 52 are connected to the bubble-generating medium 23 through the gas passage 55, and an ozone generator 56 is provided in an intermediate part of the gas passage 55. The ozone generator 56 is a device to generate ozone from oxygen molecules by ultraviolet irradiation.

Next, a method of generating ultrafine bubbles by the ultrafine bubble generation device 1 will be described. In particular, a method of generating ultrafine bubbles in a case of using ozone as a gas will be described.

First, oxygen is pumped from the compressor 22. Oxygen pumped from the compressor 22 is supplied into the ozone generator 56 through the gas passage 55. Ozone is generated from oxygen in the ozone generator 56, and the ozone is supplied to the bubble-generating medium passage 27 in the bubble-generating medium 23. The ozone supplied to the bubble-generating medium passage 27 passes through the fine hole 23A having a diameter of several μm to several tens μm provided in the bubble-generating medium 23, and becomes ultrafine bubbles to be released into a liquid. At the moment when released to a surface of the bubble-generating medium 23, ultrafine bubbles to be released into a liquid are separated from the surface by a surrounding liquid flow (a flow in a direction of an arrow in FIG. 3). At this time, since the bubble-generating medium 23 is arranged so as to be horizontal or less with respect to a liquid flow in the tube 25, ultrafine bubbles can easily move downward (in a direction of white arrows in FIG. 2) when separating from the surface of the bubble-generating medium 23, and tend to be accumulated in a lower part. Such a configuration causes independent movement into a liquid without coalescing with ultrafine bubbles generated later and ultrafine bubbles generated from the surrounding hole 23A. Further, in the ultrafine bubble generation device 1 for aquaculture, there is no need to use a powerful pump, which can suppress noise generated in the water, and can reduce stress on fish and shellfish.

The liquid in which ozone is dissolved or ultrafine bubbles coexist is temporarily stored in the downstream collection device 41. In the collection device 41, ozone that has not been dissolved or not coexisted is released from a liquid surface to outside the liquid, and collected in the collection device 41. Here, when an amount of the collected ozone becomes equal to or more than a predetermined amount, and the level sensor 45 detects that a height of a liquid surface is equal to or less than a predetermined value, the retransmission compressor 52 is driven by the control device. When the retransmission compressor 52 is driven, moisture contained in ozone is adsorbed and desorbed by the dehydration device 51, and the ozone collected in the collection device 41 is again returned into the gas passage 55 by the retransmission compressor 52, and is supplied into the bubble-generating medium 23.

Such a configuration allows ozone released to outside a liquid to be dissolved or coexisting again in the liquid, and can increase an amount of ultrafine bubbles in the liquid. In addition, ozone released to outside the liquid is not to be released to the atmosphere, enabling a harmful ozone treatment step to be omitted.

Further, in a case of using oxygen or hydrogen as the gas, the ozone generator 56 is not driven, and a gas sent from the compressor 22 is pumped as it is to the bubble-generating medium 23.

Such a configuration enables use of oxygen and hydrogen without waste since oxygen and hydrogen released to outside a liquid are not released into the atmosphere.

Thus, in the passage 21, the liquid in which a gas is dissolved or coexisting is sent to the storage tank 11 through the collection device 41.

Then, in a case of the ultrafine bubble generation device for aquaculture, fish and shellfish are cultured in a liquid in which a gas is dissolved or coexisting in the storage tank 11.

Further, in a case of the ultrafine bubble generation device for wastewater treatment, a liquid in which a gas is dissolved or coexisting is stored in the storage tank 11, and the stored liquid is purified through an action of the gas dissolved in the liquid or coexisting as ultrafine bubbles. More specifically, an action of the gas dissolved in the liquid or coexisting as ultrafine bubbles can activate bacteria or the like that decompose organic matter in the wastewater, and can purify the liquid.

As described above, the ultrafine bubble generation device 1 for aquaculture or wastewater treatment includes: the passage 21 through which a liquid flows; the compressor 22 to pump a gas to the passage 21; and the bubble-generating medium 23 to release a gas pumped by the compressor 22, into a liquid in the passage 21 as ultrafine bubbles. The bubble-generating medium 23 is formed of a carbon-based porous material, and is arranged so as to be horizontal or less with respect to a direction of a liquid flowing in the passage 21.

With such a configuration, since the bubble-generating medium 23 is formed of a carbon-based material porous member, it is possible to generate a large amount of ultrafine bubbles without generating a liquid flow with a liquid jet nozzle or the like. Further, since the bubble-generating medium 23 is arranged so as to be horizontal or less with respect to a flowing direction of a liquid, ultrafine bubbles are more likely to be released downward, and an amount of a gas that reaches a liquid surface and is released into the air can be reduced.

In addition, the passage 21 includes at least one tube 25, the bubble-generating medium 23 is disposed in the tube 25, and the tube 25 is formed so as to be arrangeable in series in a direction parallel to a direction of a liquid flowing in the tube 25.

With such a configuration, since the tube 25 is arranged in series, it is possible to continuously release ultrafine bubbles into a liquid, to efficiently dissolve a gas in the liquid or allow ultrafine bubbles to coexist, and to increase a gas concentration in the liquid.

Further, on the downstream side of the passage 21, there are provided the collection device 41 to collect a gas released from a liquid, and the retransmission compressor 52 to pump a gas from the collection device 41 to the bubble-generating medium 23. The retransmission compressor 52 pumps a gas from the collection device 41 to the bubble-generating medium 23 when the gas collected by the collection device 41 reaches a predetermined amount or more.

Such a configuration allows a gas to circulate and to be released again into a liquid, without being released into the air.

Further, the bubble-generating medium passage 27 is formed inside the bubble-generating medium 23, and the distance from the bubble-generating medium passage 27 to the surface of the bubble-generating medium 23 is set such that a ratio of a shortest distance Lmin to a longest distance Lmax is set to be 1:40 or less.

With such a configuration, since the bubble-generating medium passage 27 is formed inside the bubble-generating medium 23, and the distance from the bubble-generating medium passage 27 to the surface of the bubble-generating medium 23 is set such that the ratio of the shortest distance Lmin to the longest distance Lmax is 1:40 or less, it is possible to efficiently pump a gas to the surface of the bubble-generating medium 23, and generate ultrafine bubbles with use of the entire surface of the bubble-generating medium 23.

Second Embodiment

Figure 9:
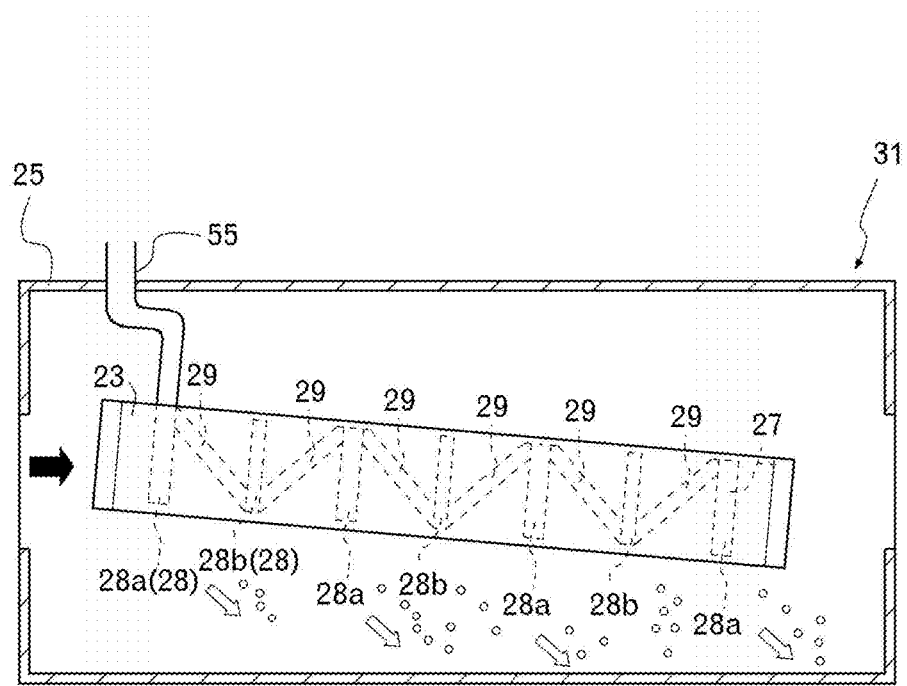
FIG. 9 is a front cross-sectional view of a bubble-generating medium according to a second embodiment of the present invention.
Figure 10:
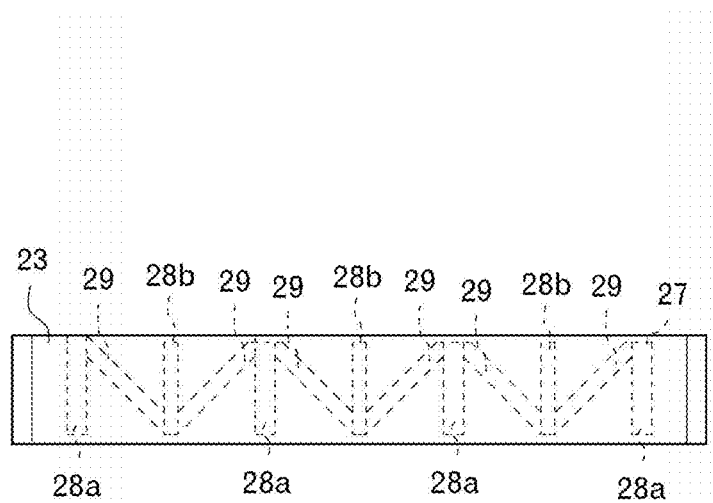
FIG. 10 is a front view of the bubble-generating medium according to the second embodiment of the present invention.
Figure 11:
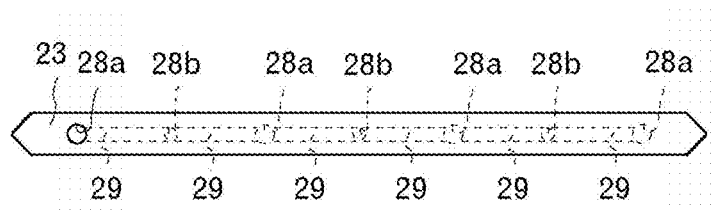
FIG. 11 is a plan view of the bubble-generating medium according to the second embodiment of the present invention.

Further, as a second embodiment, a bubble-generating medium 23 may be formed as shown in FIG. 9 to FIG. 11.

As shown in FIG. 9, the bubble-generating medium 23 is disposed inside a tube 25 forming an intermediate part of a passage 21. The bubble-generating medium 23 is arranged so as to be horizontal or less with respect to a direction of a liquid flowing in the tube 25 (a direction of a black arrow in FIG. 9). In the present embodiment, the bubble-generating medium 23 is arranged such that a downstream side is inclined downward with respect to a longitudinal direction of the tube 25.

Further, the bubble-generating medium 23 is made of a carbon-based porous material, and has a large number of fine holes 23A having a diameter of several μm to several tens μm as shown in FIG. 3. In addition, the bubble-generating medium 23 is a conductor, and bubbles generated from the bubble-generating medium 23 are charged with negative charges. In other words, when passing through the bubble-generating medium 23 as a conductor, ultrafine bubbles are added with free electrons, to be charged with negative charges. This negative charge causes bubbles to repel each other and can prevent the bubbles from coalescing into large bubbles.

The carbon-based porous material is a composite material containing carbon alone or carbon and ceramic, and is an inorganic material. Further, a surface of the carbon-based porous material is formed with a film having a thickness of several nm. The film is formed of an inorganic film containing silicon.

Further, as shown in FIG. 4 and FIG. 5, the bubble-generating medium 23 is formed into a polygonal columnar shape, and a bubble-generating medium passage 27 is formed as an internal space in the bubble-generating medium 23. The bubble-generating medium passage 27 has two types of parallel passages 28 having different cross sectional diameters provided inside the bubble-generating medium 23 and provided in parallel with an edge in a short direction in front view from one surface of the bubble-generating medium 23, and an inclined passage 29 connecting the parallel passages 28 to each other. The parallel passage 28 is formed by a first parallel passage 28a having a large cross sectional diameter and a second parallel passage 28b having a small cross sectional diameter.

One of the first parallel passages 28a has one end communicating with a surface (upper surface) of the bubble-generating medium 23 and connected to a gas passage 55. Here, in the present embodiment, one of the first parallel passages 28a is the first parallel passage 28a disposed at a most end in a left-right direction. Further, both ends of another first parallel passage 28a are disposed in the bubble-generating medium 23. Furthermore, both ends of a second parallel passage 28b are disposed in the bubble-generating medium 23. The first parallel passage 28a and the second parallel passage 28b are alternately arranged. The inclined passage 29 is a passage connecting the first parallel passage 28a and the second parallel passage 28b, and is a passage connecting an upper end of the first parallel passage 28a and a lower end (closed end) of the second parallel passage 28b. To the upper end of the first parallel passage 28a disposed at the most end in the left-right direction, a gas is supplied from the compressor 22 via the gas passage 55.

Further, a surface on which bubbles are generated in the bubble-generating medium 23 is formed to have a total surface area of 2000 $cm^2$ or less. In the present embodiment, the surface on which bubbles are generated in the bubble-generating medium 23 is a side surface excluding upper and lower surfaces of the polygonal prism, and a total surface area is approximately 1600 $cm^2$.

A gas supplied from the compressor 22 via the gas passage 55 is sent to the first parallel passage 28a disposed at the most end in the left-right direction. A part of the gas sent to the first parallel passage 28a is sent to an adjacent inclined passage 29. A part of the gas sent to the inclined passage 29 is sent to an adjacent second parallel passage 28b, and a part of the gas is sent to an adjacent inclined passage 29. This allows a gas to be uniformly sent to the entire bubble-generating medium passage 27.

Further, a distance between a surface of the bubble-generating medium 23 (mainly the side surface excluding the upper and lower surfaces) and the bubble-generating medium passage 27 is set such that a ratio of a shortest distance to a longest distance is 1:40 or less. In the present embodiment, a length Lmin at a position with a shortest distance between the surface of the bubble-generating medium 23 and the bubble-generating medium passage 27 is approximately 3.5 mm. On the other hand, in the present embodiment, a length Lmax at a position with a longest distance between the surface of the bubble-generating medium 23 and the bubble-generating medium passage 27 is set to be 140 mm or less. This allows a gas to be uniformly supplied to the surface of the bubble-generating medium 23.

Third Embodiment

Figure 12:
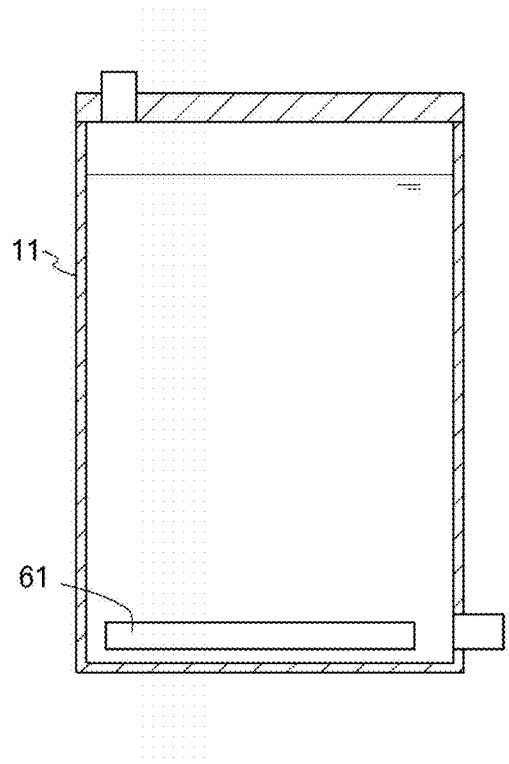
FIG. 12 is a front view of a storage tank according to a third embodiment of the present invention.

Further, as a third embodiment, as shown in FIG. 12, an agitator 61 may preferably be provided in a storage tank 11. Here, the same reference numerals as in the first embodiment denote the same components having configurations similar to those in the first embodiment, and the description thereof will be omitted.

The agitator 61 is provided in a lower part of the storage tank 11, and is a device to agitate a liquid in which a gas is dissolved or ultrafine bubbles coexist in the storage tank 11. It should be noted that, an agitation method of the agitator 61 is not limited, and for example, the agitator 61 is formed of an aeration agitator that agitates by aeration, or a rotary agitator that agitates by a rotation flow generated by rotation of a propeller.

With such a configuration, in the wastewater treatment, when performing oxidative decomposition treatment of organic matter contained in wastewater in the storage tank 11, it is possible to prevent precipitation of organic matter by agitation, and efficiently perform wastewater treatment.

Fourth Embodiment

Figure 13:
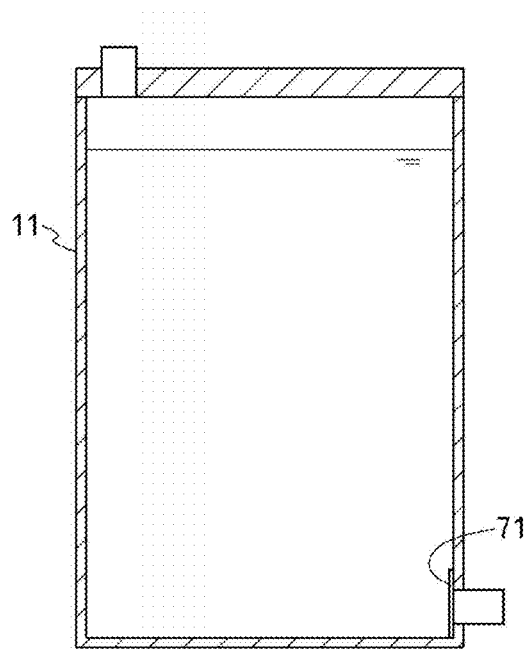
FIG. 13 is a front view of a storage tank according to a fourth embodiment of the present invention.

Further, as a fourth embodiment, as shown in FIG. 13, an ultrafine bubble generation device 1 for wastewater treatment may have a configuration including a filtration membrane 71 to filter organic matter in a storage tank 11. The filtration membrane 71 is provided, for example, near a discharge hole that is to discharge wastewater treated in the storage tank 11. Here, the same reference numerals as in the first embodiment denote the same components having configurations similar to those in the first embodiment, and the description thereof will be omitted.

Organic matter decomposed by using ultrafine bubbles is peptized (refined). This causes the organic matter to remain in the treated water to cause turbidity, making precipitation difficult to occur. Accordingly, providing the filtration membrane in the storage tank 11 enables the peptized organic matter to be removed, and can improve efficiency of the wastewater treatment.

Fifth Embodiment

Next, an ultrafine bubble generation device 101 according to a fifth embodiment will be described in detail with reference to FIG. 14 to FIG. 18. Here, the same reference numerals as in the first embodiment denote the same components having configurations similar to those in the first embodiment, and the description thereof will be omitted.

Figure 14:
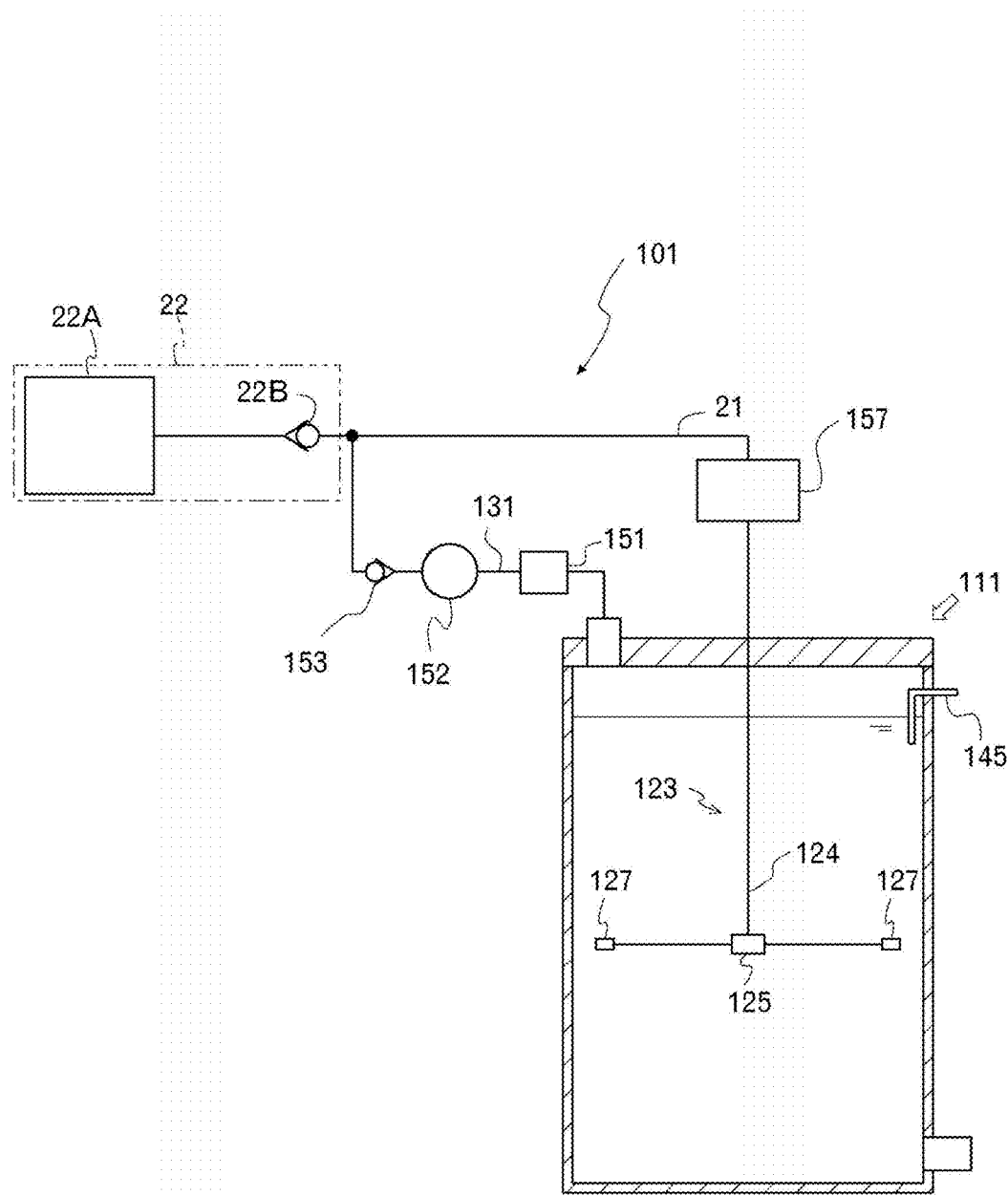
FIG. 14 is a front view of a rotary bubble generation device according to a fifth embodiment of the present invention.

The ultrafine bubble generation device 101 is an ultrafine bubble generation device for aquaculture or wastewater treatment, and is a device for generating ultrafine bubbles in a liquid. Here, the term "ultrafine bubbles" means bubbles having a size (diameter) of less than 100 μm in causing a normal temperature and a normal pressure. As shown in FIG. 14, the ultrafine bubble generation device 101 is a device allowing a gas to be dissolved in a liquid in a storage tank 111 or allowing ultrafine bubbles to coexist, and includes a passage 21 through which a liquid flows; a compressor 22 to pump a gas to the passage 21; and a rotary bubble generation device 123 to release the gas pumped by the compressor 22 as ultrafine bubbles to a liquid in the storage tank 111.

The storage tank 111 is a tank that stores a liquid in which a gas is dissolved or coexisting as ultrafine bubbles.

Here, the term "dissolved" means a state in which a gas is dissolved and exists in a liquid. In addition, the term "coexist" means a state in which a gas exists as ultrafine bubbles in a liquid.

A liquid stored in the storage tank 111 is seawater or fresh water such as rivers and lakes, in a case of an ultrafine bubble generation device for aquaculture, while the liquid is seawater, fresh water such as rivers and lakes, domestic wastewater, industrial wastewater, and the like in a case of an ultrafine bubble generation device for wastewater treatment.

Further, the gas to be supplied to the storage tank 111 is air, oxygen, ozone, hydrogen peroxide, or the like in a case of an ultrafine bubble generation device for aquaculture, while the gas is a base having an oxidizing action, such as oxygen, ozone, or hydrogen peroxide, in a case of an ultrafine bubble generation device for wastewater treatment.

The passage 21 is a member to allow a liquid to pass. In the passage 21, an upstream end in a liquid flow is connected to a liquid tank, sea, river, or the like.

The compressor 22 is a device to pump a gas to the rotary bubble generation device 123. In the present embodiment, the compressor 22 includes a gas storage container 22A to store a gas and a check valve 22B.

Figure 15:
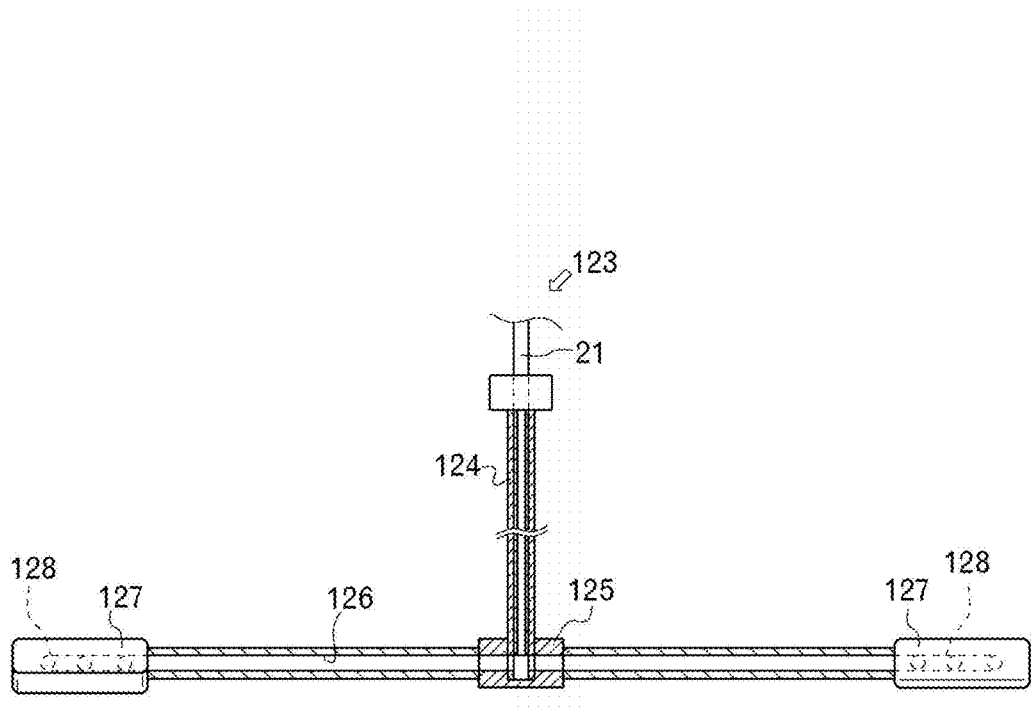
FIG. 15 is a front cross-sectional view of the rotary bubble generation device according to the fifth embodiment of the present invention.
Figure 16:
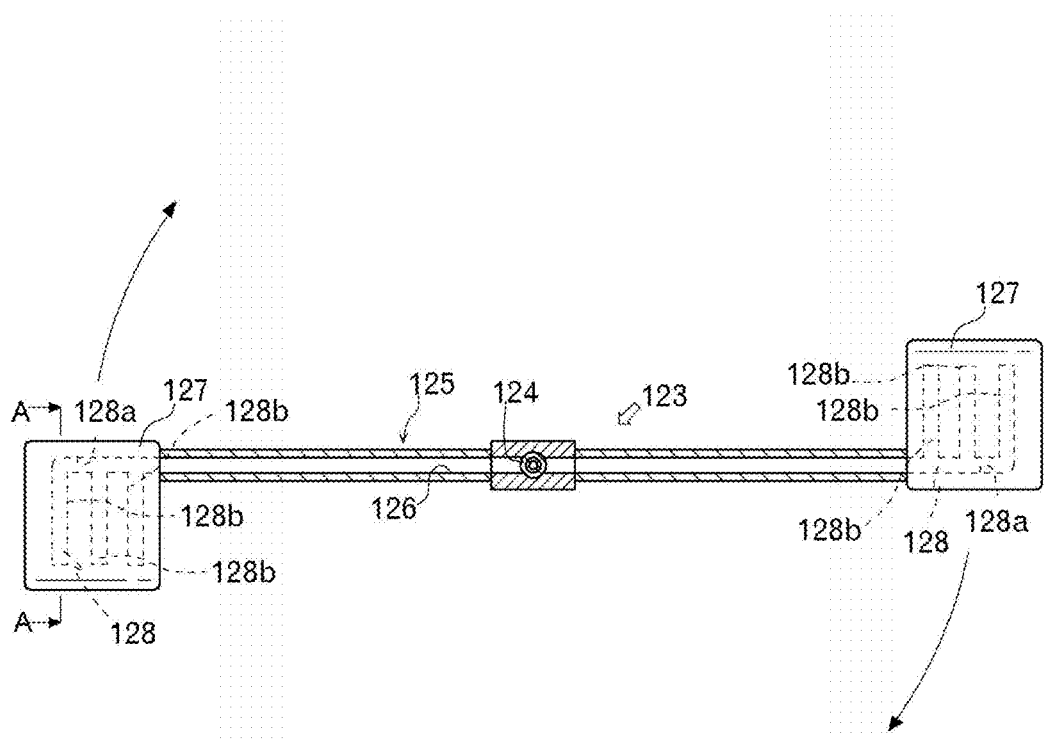
FIG. 16 is a plan cross-sectional view of the rotary bubble generation device according to the fifth embodiment of the present invention.

The rotary bubble generation device 123 is a device to generate ultrafine bubbles in a liquid. Here, the term "ultrafine bubbles" means bubbles having a size (diameter) of less than 100 μm in causing a normal temperature and a normal pressure. As shown in FIG. 15 and FIG. 16, the rotary bubble generation device 123 is a device to supply a gas into the storage tank 111 as ultrafine bubbles, and includes: a rotary shaft 124; a rotational body 125 provided so as not to rotate relative to the rotary shaft 124; and a bubble-generating medium 127 fixed to the rotational body 125. In a case of using the rotary bubble generation device 123, a lower part from an intermediate part of the rotary shaft 124 is disposed in the liquid of the storage tank 111.

Inside the rotary shaft 124 and the rotational body 125, there is provided an internal passage 126 to allow a gas pumped from the compressor 22 to pass, and the internal passage 126 is connected to a bubble-generating medium passage 128 in the bubble-generating medium 127.

Figure 18:
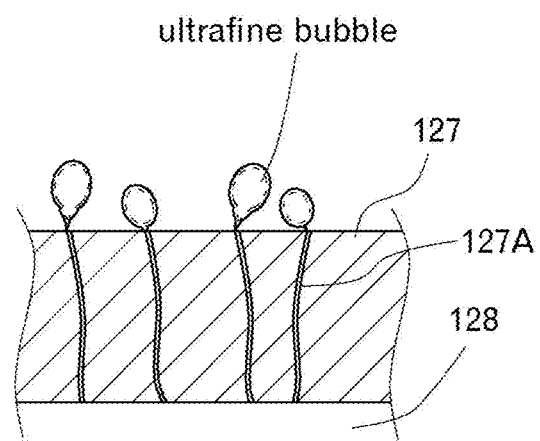
FIG. 18 is a partially enlarged cross-sectional view of the bubble-generating medium according to the fifth embodiment of the present invention.

The bubble-generating medium 127 is disposed inside the storage tank 111. The bubble-generating medium 127 is made of a carbon-based porous material, and has a large number of fine holes 127A having a diameter of several μm to several tens μm as shown in FIG. 18. In addition, the bubble-generating medium 127 is a conductor, and bubbles generated from the bubble-generating medium 127 are charged with negative charges. In other words, when passing through the bubble-generating medium 127 as a conductor, ultrafine bubbles are added with free electrons, to be charged with negative charges. This negative charge causes bubbles to repel each other and can prevent the bubbles from coalescing into large bubbles.

The carbon-based porous material is a composite material containing carbon alone or carbon and ceramic, and is an inorganic material. Further, a surface of the carbon-based porous material is formed with a film having a thickness of several nm. The film is formed of an inorganic film containing silicon.

Figure 17:
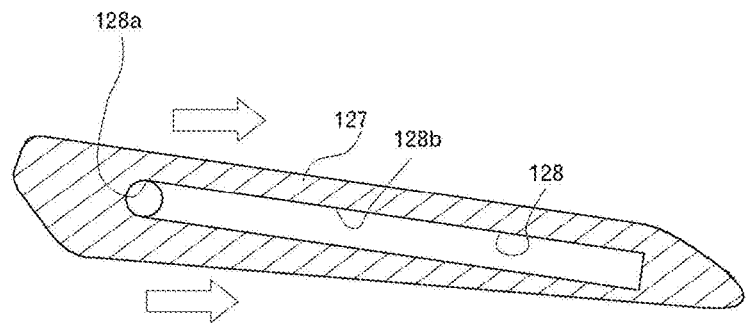
FIG. 17 is a cross-sectional view taken along line A-A of a bubble-generating medium according to the fifth embodiment of the present invention.

Further, the bubble-generating medium 127 is formed in a plate shape (substantially streamlined in cross sectional view) such that a thickness at foremost in a rotational direction (a direction of arrows in FIG. 16) is thick while a thickness at termination in the rotational direction is thin. The bubble-generating medium 127 can be rotated and fixed in a vertical direction, so that an inclination angle of the bubble-generating medium 127 can be freely changed. In the present embodiment, as shown in FIG. 17, the bubble-generating medium 127 is arranged so as to incline downward from an upstream side in the rotational direction toward a downstream side in the rotational direction. Such a configuration causes the bubble-generating medium 127 to be arranged so as to be horizontal or less with respect to a liquid flow direction.

With such a configuration, on the lower side of the bubble-generating medium 127, a liquid in contact with a lower surface of the bubble-generating medium 127 flows downward to generate a downward liquid flow, and on an upper side of the bubble-generating medium 127, a liquid flows along an upper surface of the bubble-generating medium 127 to generate a downward liquid flow. Accordingly, rotating the bubble-generating medium 127 can generate a downward liquid flow and can also stir the liquid.

Since ordinary bubbles once sink downward and then float up again even when a downward liquid flow is generated, it has been necessary to apply large pressure to send the bubbles downward. However, according to the present embodiment, it is possible to easily send ultrafine bubbles downward only by generating a downward liquid flow by utilizing the characteristic of the ultrafine bubbles having small buoyancy.

In the bubble-generating medium 127, the bubble-generating medium passage 128 is provided. As shown in FIG. 16 and FIG. 17, the bubble-generating medium passage 128 is provided with a first passage 128a provided inside the bubble-generating medium 127 and extending in a short direction of the bubble-generating medium 127, and a plurality of second passages 128b extending from the first passage 128a to an intermediate part in a longitudinal direction of the bubble-generating medium 127. One end of the bubble-generating medium passage 128 is connected to the internal passage 126.

Further, a surface on which bubbles are generated in the bubble-generating medium 127 is formed to have a total surface area of 2000 cm$^2$ or less. In the present embodiment, the surface on which bubbles are generated in the bubble-generating medium 127 is two of upper and lower surfaces, and a total surface area is approximately 1600 cm$^2$.

Further, a distance between a surface of the bubble-generating medium 127 and the bubble-generating medium passage 128 is set such that a ratio of a shortest distance to a longest distance is 1:40 or less.

An upper surface of the storage tank 111 is provided with a releasing passage 131 to externally send a gas that is not dissolved or not coexisting in the liquid but released out of the liquid.

Inside the storage tank 111, a level sensor 145 is provided. The level sensor 145 is a device connected to a control device (not shown), and configured to detect whether or not a height of a liquid in the storage tank 111 has become equal to or less than a certain level.

In an intermediate part of the releasing passage 131, there are provided a dehydration device 151, a retransmission compressor 152, and a check valve 153. The retransmission compressor 152 is connected to a control device (not shown). The dehydration device 151 is a device to adsorb and desorb moisture contained in a gas released into the releasing passage 131, and is a device, for example, provided with a desorption film or a water absorbent such as silica gel. The retransmission compressor 152 pumps a gas to the rotary bubble generation device 123, only when an amount of a gas released to outside the storage tank 111 exceeds a predetermined value.

Further, the compressor 22, the retransmission compressor 152, and the rotary bubble generation device 123 are connected by the passage 21, and an ozone generator 157 is provided in an intermediate part of the passage 21. The ozone generator 157 is a device to generate ozone from oxygen molecules by ultraviolet irradiation.

Next, a method of generating ultrafine bubbles by the ultrafine bubble generation device 101 will be described. In particular, a method of generating ultrafine bubbles in a case of using ozone as a gas will be described.

First, oxygen is pumped from the compressor 22. Oxygen pumped from the compressor 22 is supplied into the ozone generator 157 through a gas passage. Ozone is generated from oxygen in the ozone generator 157, and the ozone is supplied to the rotary bubble generation device 123. The ozone supplied to the rotary bubble generation device 123 is supplied to the bubble-generating medium passage 128 via the internal passage 126, passes through the fine hole 127A having a diameter of several μm to several tens μm provided in the bubble-generating medium 127, and becomes ultrafine bubbles to be released into a liquid. The ultrafine bubbles are separated from the surface by a flow (a flow in a direction of an arrow in FIG. 17) generated between the rotating bubble-generating medium 127 and surrounding liquid. Such a configuration causes independent movement into a liquid without coalescing with ultrafine bubbles generated later and ultrafine bubbles generated from the surrounding hole 127A.

In the storage tank 111, ozone that has not been dissolved or not coexisted is released from a liquid surface to outside the liquid, and accumulated in an upper part of the storage tank 111. Here, when an amount of the accumulated ozone becomes equal to or more than a predetermined amount, and the level sensor 145 detects that a height of a liquid surface is equal to or less than a predetermined value, the retransmission compressor 152 is driven by the control device. When the retransmission compressor 152 is driven, moisture contained in ozone is adsorbed and desorbed by the dehydration device 151, and the ozone accumulated in the storage tank 111 is again returned into the passage 21 by the retransmission compressor 152, and is supplied into the rotary bubble generation device 123.

Such a configuration allows ozone released to outside a liquid to be dissolved or coexisting again in the liquid, and can increase an amount of ultrafine bubbles in the liquid. In addition, ozone released to outside the liquid is not to be released to the atmosphere, enabling a harmful ozone treatment step to be omitted.

Further, in a case of using oxygen or hydrogen as the gas, the ozone generator 157 is not driven, and a gas sent from the compressor 22 is pumped as it is to the rotary bubble generation device 123.

Such a configuration enables use of oxygen and hydrogen without waste since oxygen and hydrogen released to outside a liquid are not released into the atmosphere.

In a case of the ultrafine bubble generation device for aquaculture, fish and shellfish are cultured in a liquid in which a gas is dissolved or coexisting in the storage tank 111.

Further, in a case of the ultrafine bubble generation device for wastewater treatment, a liquid in which a gas is dissolved or coexisting is stored in the storage tank 111, and the stored liquid is purified through an action of the gas dissolved in the liquid or coexisting as ultrafine bubbles. More specifically, an action of the gas dissolved in the liquid or coexisting as ultrafine bubbles can activate bacteria or the like that decompose organic matter in the wastewater, and can purify the liquid.

INDUSTRIAL APPLICABILITY

The present invention can be used in a technique of an ultrafine bubble generation device for aquaculture or wastewater treatment, for purifying wastewater, or purifying aquaculture water and supplying oxygen to aquaculture water. In particular, the present invention can be used in a technique of an ultrafine bubble generation device for aquaculture or wastewater treatment for generating fine bubbles in liquid.

REFERENCE SIGNS LIST 1 ultrafine bubble generation device
11 storage tank
21 passage
22 compressor 23 bubble-generating medium
25 tube
27 bubble-generating medium passage
41 collection device
45 level sensor
52 retransmission compressor
53 check valve

The invention claimed is:

1. An ultrafine bubble generation device for aquaculture or wastewater treatment comprising:
   a passage through which liquid flows;
   a compressor to pump a gas to the passage; and
   a bubble-generating medium to release the gas pumped by the compressor as ultrafine bubbles to a liquid in the passage,
   wherein
   the bubble-generating medium is formed of a carbon-based porous material,
   the passage includes at least one tube, the bubble-generating medium is disposed in the at least one tube, a main extension direction of the bubble-generating medium is inclined with a main extension direction of the at least one tube, and the at least one tube is formed to be arrangeable in series in a direction parallel to a direction of a liquid flowing in the at least one tube.

2. The ultrafine bubble generation device according to, claim 1,
   wherein an internal space is formed inside the bubble-generating medium, and a distance from the internal space to a surface of the bubble-generating medium is set to cause a ratio of a shortest distance between a surface of the bubble-generating medium and a bubble-generating medium passage to a longest distance between the surface of the bubble-generating medium and the bubble-generating medium passage to be 1:40 or less.

3. The ultrafine bubble generation device for aquaculture or wastewater treatment according to claim 1, further comprising, on a downstream side of the passage,
   a collection device to collect a collection gas released from a liquid; and
   a retransmission compressor to pump the gas from the collection device to the bubble-generating medium,
   wherein
   the retransmission compressor pumps the gas from the collection device to the bubble-generating medium when an amount of the collection gas collected by the collection device reaches a predetermined amount or more.

4. The ultrafine bubble generation device according claim 3,
   wherein an internal space is formed inside the bubble-generating medium, and a distance from the internal space to a surface of the bubble-generating medium is set to cause a ratio of a shortest distance between a surface of the bubble-generating medium and a bubble-generating medium passage to a longest distance between the surface of the bubble-generating medium and the bubble-generating medium passage to be 1:40 or less.

5. The ultrafine bubble generation device according to claim 3, further comprising:
   a storage tank provided on a downstream side of the passage; and
   an agitator provided in the storage tank.

6. The ultrafine bubble generation device according to claim 5,
   wherein an internal space is formed inside the bubble-generating medium, and a distance from the internal space to a surface of the bubble-generating medium is set to cause a ratio of a shortest distance between a surface of the bubble-generating medium and a bubble-generating medium passage to a longest distance between the surface of the bubble-generating medium and the bubble-generating medium passage to be 1:40 or less.

* * * * *